Nov. 9, 1926.  
W. W. HARRIS  
1,605,942  
PIT ACETYLENE GENERATOR  
Filed Feb. 18, 1922  
2 Sheets-Sheet 1
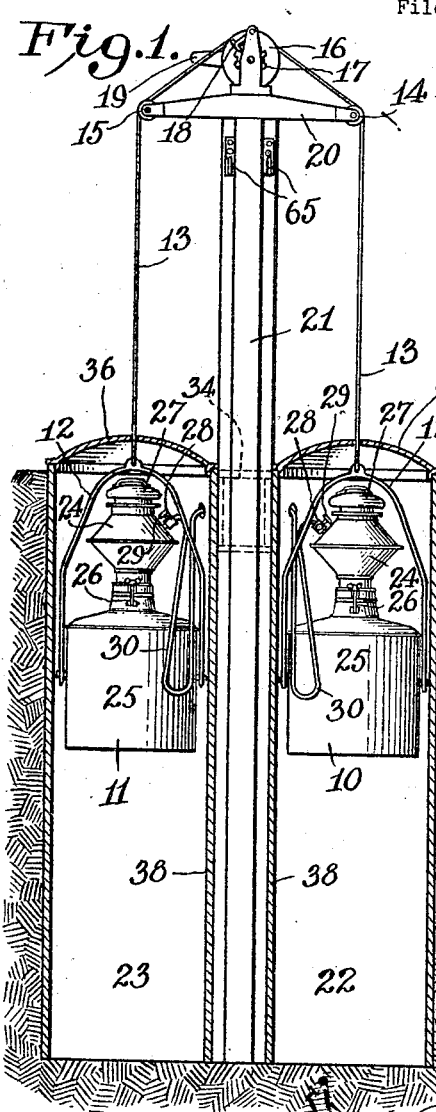
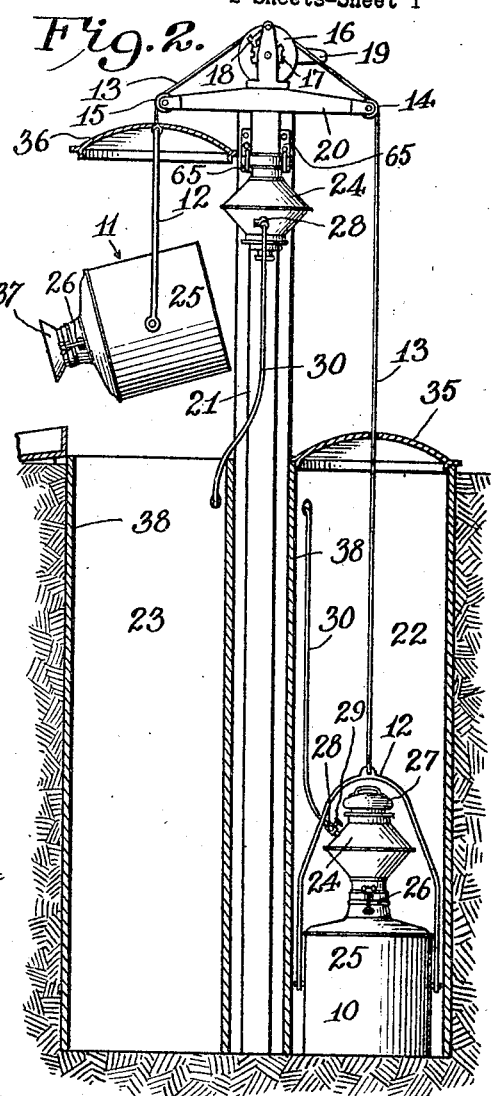
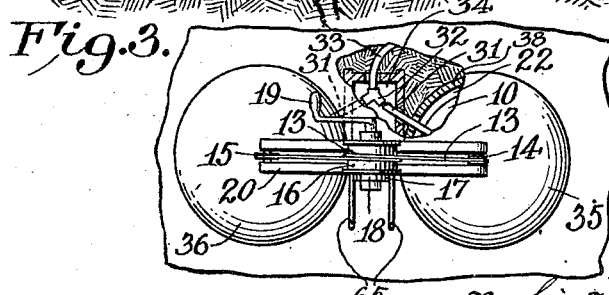
Inventor,  
William W. Harris,  
By his Attorney,  
Henry J. Lucke.

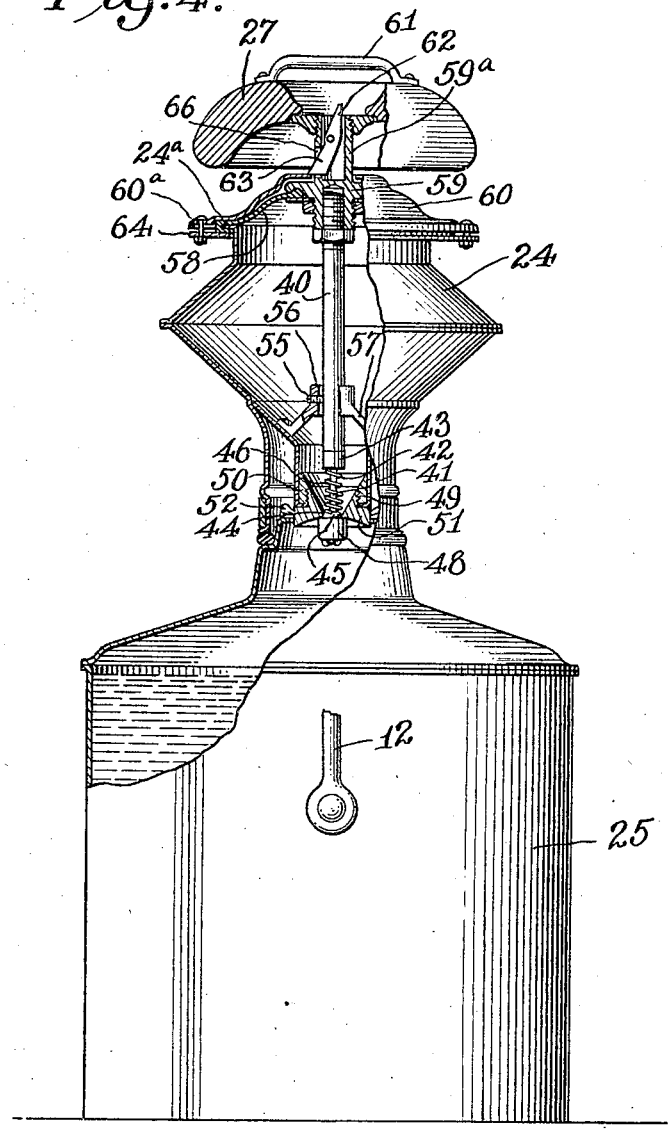

Patented Nov. 9, 1926.

1,605,942

UNITED STATES PATENT OFFICE.

WILLIAM W. HARRIS, OF NEWPORT, NEW JERSEY.

PIT ACETYLENE GENERATOR.

Application filed February 18, 1922. Serial No. 537,469.

This invention relates to acetylene generator systems.

Heretofore it has been customary to locate certain types of acetylene generators in a pit exteriorly of the house or the like for the purpose of preventing freezing of the water in the generator and to facilitate disposal of the sludge resulting from the chemical action of the carbid with the water. In such prior arrangements the generator has been usually of the so-called "gas-bell" type, the lower container of which rests on the bottom of the pit. The sludge is removed from the lower container, after the upper container has been raised, by means of a pump, let down into the sludge container and the sludge pumped to the surface of the ground about the pit. Accordingly, in re-charging such prior art pit generators, upon exhaustion of the carbid charge the house supply of acetylene is shut off and must so remain until the next day as the re-charging of such generators is not usually practicable except by daylight, on account of the serious inconvenience of disassembling the generator for the purpose of renewing the charge, coupled with the serious inconvenience of pumping out the sludge. Furthermore, in order to furnish a supply of acetylene for the succeeding night, the re-charging is compulsory during the day following exhaustion regardless of whether the time is opportune or whether the weather conditions are favorable or not.

An object of this invention is to provide a system of pit acetylene generator units arranged in an improved manner, to provide for re-charging with carbid and the removal of sludge and re-charging of water, by simple operation and with light physical effort, thereby enabling these operations to be easily performed by any person.

A further object of the invention is the provision of a generating system in the form of pairs of units suspended in substantially equiposed relation to afford concealment in a pit and arranged so that when it is desired to re-charge a depleted unit such depleted unit is elevated by the aid of the weight of the other unit of the pair. By such arrangement the acetylene supply is assured by one of the units even though the outer unit has become exhausted and the re-charging of the exhausted unit may be deferred to any opportune time during the period of furnishing of the acetylene supply by the other unit.

Pursuant to a preferred form of my invention, the system comprises generator units arranged in pairs, normally concealed in pits respectively, the units of such pair being connected with one another by means of a flexible cable or the like passing over suitable supporting means for the cable, the pits being provided with suitable covers for closing the same when the units are concealed therein, whereby when it is desired to re-charge a depleted unit, the depleted unit is readily elevated from its pit by means of a suitable drum and crank, the operation of which is aided by the weight of the non-depleted unit, thereby also automatically raising the cover of the pit of the depleted unit; the generator system is arranged for continuance of the acetylene supply, by the non-depleted unit during the stage of re-charging the depleted unit; means are provided for holding the carbid holder of the depleted unit in ready position for re-charging with carbid and for readily tilting its water reservoir to remove sludge therefrom and thereafter re-charge with water.

Further features and objects of the invention will more fully appear from the following description and the accompanying drawings, in which—

Fig. 1 is a vertical central sectional elevation showing a generator system comprising a pair of units arranged and constructed in accordance with my invention, the units being shown in normal concealed positions;

Fig. 2 is a similar elevation, showing one unit raised for re-charging with carbid, removal of sludge and recharging of water, the positioning of same being assisted and maintained by the weight of the non-depleted unit;

Fig. 3 is a top plan view of Fig. 1, partly broken away below one pit cover and showing the connections from the two units to the common service pipe;

Fig. 4 is a central sectional elevation of a generating unit and preferred form of carbid feeding mechanism.

Referring to the drawings, the pair of generating units are indicated 10, 11, each generator being provided with the bail 12, to which is connected the cable 13 passing over the oppositely disposed, guide pulleys 14, 15 and the central drum 16, about which the cable 13 is wound. To the drum 16 is secured the cog-wheel 17 and the dog 18 is provided to be swung on either side of its pivot in locking relation with the cog-wheel 17, to thereby lock the drum 16 and the cable in any desired position.

The drum 16 is operated by its crank 19. As is indicated in the drawings, the crank 19 is located at a suitable height above the ground to afford convenient manual operation.

As shown, the pulleys 14, 15 are mounted on the transverse beam 20, supported on the vertical upright 21, secured in the ground between the pair of pits 22, 23.

Each generator unit comprises a suitable carbid hopper 24 removably mounted on its water reservoir 25, the carbid hopper 24 being secured to its water reservoir 25 by means of the oppositely disposed lock bolts 26.

Such generating units may each be of any suitable type of self-contained arrangement of the carbid feeding type and preferably embody feeding mechanism for feeding the carbid to the water reservoir, the operation of which is controlled by variations of volume of the gas accumulated within such unit, and therefore automatically responsive to varying extents of service requirement, such as is disclosed and claimed in my copending application Serial No. 531,557, filed by me on January 25th, 1922.

In Fig. 4, I have shown the feeding arrangement of one of the preferred forms set forth in my aforesaid copending application #531,557, wherein the plunger 40 is provided at its carbid feeding portion with the yieldable feeding element in the form of the coil 41 of wire or like material, having its one end 42 yieldingly lodged in a cavity in the part 43 and its opposite end 44 yieldingly lodged about the base portion 45. The part 43 and the base portion 45 are mounted to be non-yielding relatively to one another, as by forming the part 43 and the base portion 45 integrally with one another thereby providing for the intermediate rod portion 46. To safe-guard against the passage of vapors when the carbid feeding mechanism is in normal locked position or to prevent passage of water into the carbid holder 24 due to inadvertent handling of the generator, the cap 48 of rubber or the like is provided and removably mounted on the base portion 45.

The valve seat 49 is comprised of an inwardly disposed stationary valve portion 50 and an outwardly disposed portion 51, screw-threaded or otherwise removably secured to the inner valve portion 50; the removable valve portion 51 is provided with spaced fingers 52 for facilitating unscrewing the valve portion 51 and for replacing the same.

The plunger 40 in the form of the invention shown is guided by the means of the three or more spaced set screws 55 located within the hub 56 of the spider 57, the legs of which are riveted or otherwise secured to the inner face of the carbid holder 24.

The diaphragm 58 of rubber fabric or the like is secured to the plunger 40 in any suitable manner, as by means of the connecting piece 59 to which it is centrally clamped in any suitable manner. The connecting piece 59 extends upwardly at 59ª through the domed top 60 of the carbid hopper 24, and is constructed to receive and support the weight 27 having a hand-hold 61. Such extension 59ª is preferably tubular, within which is located the latch 63 pivoted non-symmetrically at 62. The extension 59 is slotted at 66 to permit the end of the latch 63 to pass therethrough when the weight 27 has been elevated either automatically or manually by means of its hand-hold 61 to its uppermost position, whereupon the latch 63 is brought in locking relation with the domed top 60 of the carbid hopper 24. In such locking position of the plunger 40, the base portion 45 is brought within the orifice of the feeding valve 49, and thereupon the flow of carbid from the carbid holder 24 into the water reservoir is shut off.

The diaphragm 58 is clamped at its periphery to the flange 24ª of the carbid holder 24 in any suitable manner as by insertion between the flange 60ª of the domed top 60 and the ring 64.

Preferably the terminus of the service pipe 33 is brought to the auxiliary pit or compartment 34, located adjacent the pair of pits 22, 23.

The covers 35, 36 may be secured to the cable 13 in any suitable manner, as by providing each cover with a central opening and passing the respective end portions of the cable 13 therethrough.

In the circumstance of depletion of any unit, such depleted unit is elevated above its pit, by turning the crank 19 in the proper direction, to a convenient height above the ground, as is indicated in Fig. 2. The carbid holder 24 may now be removed from the water reservoir 25 by unlocking the bolts 26 and the carbid holder 24 is then inverted and may be conveniently supported on the pair of hooks 65, located say on one side of the standard 21, whereupon after unscrewing the removable valve seat portion 51, the carbid can be poured about the base portion 45 of the plunger 40 and into the interior of the carbid holder 24.

The water reservoir 25 may be tilted by swinging on its bail 12 as is indicated in Fig. 2, to thereby discharge the sludge.

To facilitate the discharge of the sludge and the re-filling of water, the attachment 37 as described and claimed in my copending application 535,842, filed February 1st, 1922, is secured to the mouth of the water reservoir by means of the lock bolts 26.

Upon re-charging the carbid holder 24 with the proper amount of carbid, and refilling the water reservoir 25 with water, the carbid holder 24 is replaced on the mouth of the water reservoir 25 and secured thereto by the lock bolts 26. The weight 27 is then re-placed on the extension 59ª of the plunger 40, and the re-charged unit is now prepared for relocating the same within its pit 23, by relowering the same by means of crank 19, in which action the cover 36 of the pit 23 is lowered simultaneously with the unit.

It will be noted that the dog 18 is freely pivoted to permit swinging over from each side of its pivotal center to be brought into locking relation with the cog-wheel 17 secured to the drum 16. It is desirable to place the dog 18 in locking position with the cog-wheel 17 when either unit is raised from its pit, and when the units are normally concealed in the pits, to safeguard against meddling with the cable 13.

The carbid feeding mechanism of each generating unit is subject to the control of a suitable weight 27 resting upon the plunger of the carbid feeding mechanism, as is described more fully hereinafter. The outflow of the gas from each unit may be through a discharge outlet 28, provided with the shut-off cock 29, to which is connected one end of the flexible piping 30 of rubber composition or flexible metallic hose or the like. The opposite ends 31 of such pair of piping 30 are respectively connected to the inflow openings of the T-connection 32, see Fig. 3, leading to the service pipe 33 and thence to the rooms of the house or other locations of use. When the system is employed for lighting a house or the like, such pits 22, 23 may be in the yard or elsewhere exteriorly of the house and the service pipe 33 may be run underground to the house.

Such generator units operate to feed carbid to the water upon variations of the volume of gas accumulated within the generator units, incident to the outflow through the service pipe. The generation of acetylene takes place in the respective units corresponding to withdrawal at the instants of use, the relative extents of acetylene production by the respective units being dependent upon the relative weights 27 by which the plungers are regulated. It will also appear that the total generation of acetylene from time to time is responsive automatically to the service requirements.

If it is desired to arrange that one unit become exhausted in advance of the other unit, any suitable additional weight may be attached to the weight 27 of one unit, and the unit thus more heavily weighted will be caused to operate more rapidly than such other unit, thereby providing in advance that such more heavily weighted unit become exhausted at an earlier stage. By such means the operator can predetermine which of the units will require re-charging in advance of the other unit and to thereby make certain the order of re-charging the units. When re-charging such exhausted unit the additional weight can then be shifted to the previously re-charged unit to predetermine that such previously re-charged unit attain first the next stage of exhaustion.

In such method of operation of the generating units to predetermine the order of depletion of the generating units, the additional weight added to the weight 27 of the one unit, is very slight.

As another method of operating the units, an additional weight which is relatively heavier as compared with the additional weight referred to in the preceding method, may be attached to one generating unit, whereby such heavily weighted generating unit alone operates to furnish the acetylene until entirely depleted, while the other generating unit remains in substantially fully charged condition, and after such more heavily weighted generating unit has become fully depleted the other generating unit begins to function automatically without cessation of the acetylene supply to the common service pipe 33.

In the foregoing two methods of operation of the generating units, each generating unit is set in normal operation of its feeding mechanisms, that is to say, the latches 63 are not in closed position.

As another method of operating the generating units, the feeding mechanism of one of the generating units is locked in the inoperative position by means of its latch 63 while the other generating unit is permitted to operate normally. Upon depletion of the operating unit, the supply of acetylene through the common service pipe 33 will be interrupted whereupon the latch 63 of the other generating unit is manually released to set the same in operation.

It will be understood that the pits 22, 23 may be intercommunicating in lieu of being separate pits. Preferably, the pit or pits are lined by means of a metal tubular lining 38, concrete or the like. It will be noted that each pit 22, 23, is of a depth to permit its generating unit to be lowered sufficiently to elevate the other unit above its pit and preferably of proper depth to allow the lowered unit to rest on the bottom of its pit during the stage of re-charging of the other unit.

I claim:

1. In an acetylene generating system comprising a pair of generating units, each unit comprising a water reservoir and a carbid hopper detachably carried by the water reservoir, of a bail for pivotally suspending each water reservoir, enclosure means for said generating units, a cable connecting said bails at opposing ends of said cable and means for supporting said cable to freely suspend said generating units in said enclosing means when said generating units are in operating position.

2. In an acetylene generating system comprising a pair of generating units, each unit comprising a water reservoir and a carbid hopper detachably carried by the water reservoir, of a bail for pivotally suspending each water reservoir, enclosure means for said generating units, a cable connecting said bails at opposing ends of said cable and means for supporting said cable to freely suspend said generating units within said enclosing means when said generating units are in operating position, the bottom of said enclosing means being disposed at a distance below said supporting means to locate one of said generating units above the top of said enclosing means when the other of said generating units is at said bottom.

3. In an acetylene generating system, a pair of generating units, each unit comprising a water reservoir and a carbid hopper removably carried by its water reservoir, enclosure means for said units, cover means for said enclosure means, a standard, a cable movably carried by said standard, a bail pivotally suspending each water reservoir from the opposite ends of said cable to permit counterpoised elevation and depression respectively of said units and means for securing said cover means respectively to said cable.

4. An acetylene generating system comprising a pair of generating units, a pair of pits, means for suspending such generating units in substantially counterpoised operating position above the bottoms of said pits, said suspending means including bails carrying said generating units, each pit having its bottom located below the operating position of the generating unit therein contained to an extent permitting its unit to be lowered therein when the other unit is elevated out of its pit.

In testimony whereof I have signed this specification this 16th day of February, 1922.

WILLIAM W. HARRIS.